M. A. OWEN.
CUP AND SPOON HOLDER FOR COOKING UTENSILS.
APPLICATION FILED DEC. 20, 1920.

1,385,580.  Patented July 26, 1921.

Inventor
Minnie A. Owen
By
Attys.

UNITED STATES PATENT OFFICE.

MINNIE A. OWEN, OF CHARLOTTETOWN, PRINCE EDWARD ISLAND, CANADA.

CUP AND SPOON HOLDER FOR COOKING UTENSILS.

1,385,580.  Specification of Letters Patent. Patented July 26, 1921.

Application filed December 20, 1920. Serial No. 432,144.

*To all whom it may concern:*

Be it known that I, MINNIE A. OWEN, a subject of the King of Great Britain, and resident of the city of Charlottetown, in the Province of Prince Edward Island and Dominion of Canada, have invented certain new and useful Improvements in Cup and Spoon Holders for Cooking Utensils, of which the following is a full, clear, and exact description.

This invention relates to attachments for culinary vessels, and the object of the invention is to provide means for holding a spoon, fork, cup or the like on a vessel in such a manner that it will not become heated by contact with the contents of the vessel and also in such a position that any drip from the spoon will go into the vessel.

A further object is to provide a simple and inexpensive device of great durability which may be easily attached to and detached from a vessel and which will be sanitary.

A still further object is to provide a device adaptable to vessels of different sizes.

The device consists essentially of a member adapted to hook onto the rim of a vessel and to provide a plurality of hooks within the vessel to support the desired articles.

In the drawings which illustrate the invention:—

Figure 1:
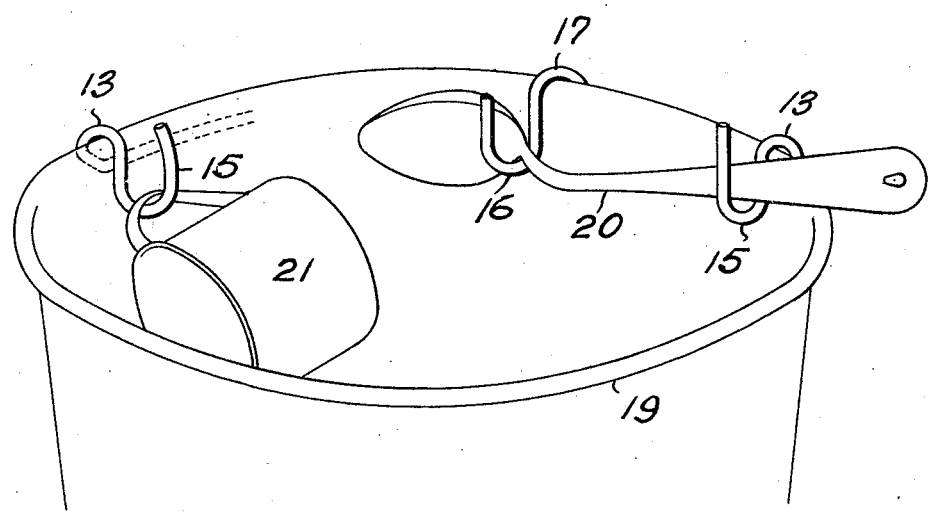
Figure 1 is a perspective view illustrating the application and use of the device.
Figure 2:
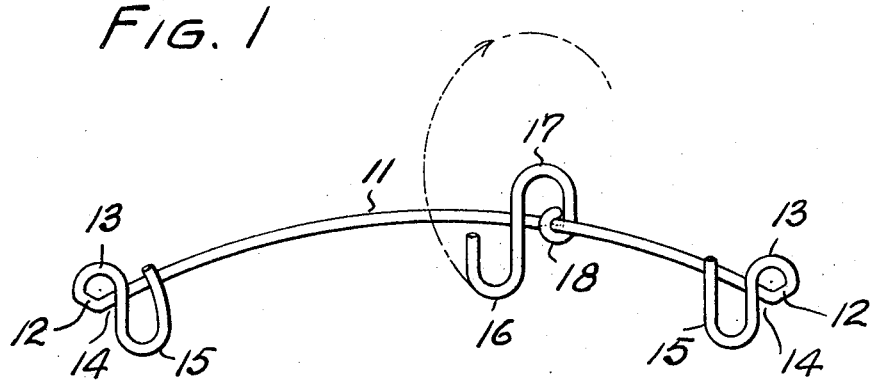
Fig. 2 is a perspective view of the device alone.
Figure 3:
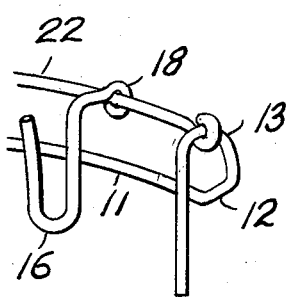
Fig. 3 is an end elevation of the same, illustrating the application to a vessel.

Referring more particularly to the drawings, 11 designates an arcuate member having radially disposed, outwardly extending portions 12 at each end terminating in inverted U-shaped loops 13. The inner ends of these loops are spaced from the member 11 as shown at 14 and extend below the plane of the member 11, whereas the portions 13 extend above. The loops terminate in hooks 15 of any suitable shape, the bottoms of the hooks being below the plane of the member 11 as clearly shown. A supplementary hook 16 is provided and is slidably mounted with relation to the member 11 in any suitable way, such as by extending the wire downwardly in a curve 17 from the top of the hook and looping the end around the member 11 as at 18.

Figure 4:
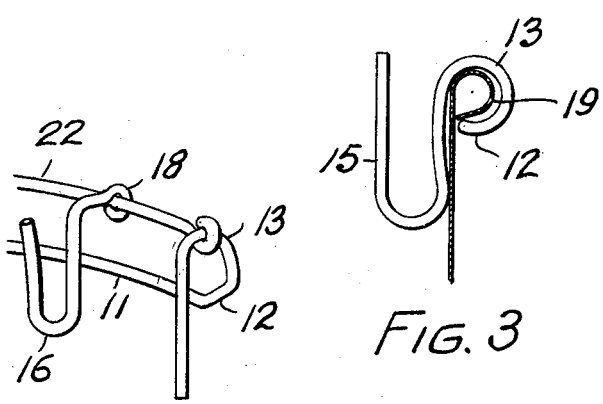
Fig. 4 is a fragmentary perspective view illustrating modifications.

The method of applying and operation of the device is as follows:—The member 11, which is preferably readily flexible, is bent around the outside of the vessel to which the device is to be attached and the loops 13 slipped over the edge of the vessel so that the member 11 is disposed externally and the hooks 15 and 16 internally of the vessel, the loops or bends 13 and 17 resting on the edge of the vessel as clearly shown in Fig. 1. Most culinary vessels today are provided with a rolled rim, such as shown at 19, over which the loops 13 and 17 extend while the radially disposed portions 12 extend under the rim as will be understood from Fig. 1. The rim thus operates to hold the device securely and against slipping off while the hooks project inwardly at the top of the vessel to form supports for any utensils, such as the spoon 20 and mug or measure 21. The parts 12 and 13 exert a certain grip around the rolled rim 19, but it will be understood that the device will remain with almost equal security on a vessel without a rim. The hook 16 is slidable toward or away from the other hooks in order that it may be adjusted relatively to one of them when two hooks are necessary to support a utensil, as in the case of a spoon or fork. While only one movable hook 16 has been shown it will be understood that any number of additional hooks may be provided if desired and that the invention is not limited to a single movable hook 16. It will also be understood that in so far as the attachment of the device to a vessel is concerned, the hooks 15 are unnecessary and may be omitted, their place being taken by sliding hooks 16 with the advantage that the hooks when not in use can be swung outside of the vessel so as to be out of the way. It will also be understood that while movable hooks 16 are preferably attached to the member 11 for the sake of economy in manufacture, that they may be attached to a supplementary member 22 extending substantially parallel with the member 11 and connected thereto in any suitable manner, as indicated in Fig. 4. When it is desired to disconnect the device from a vessel the same is withdrawn with a combined upward movement and upward swing of the hooks to assist in disengaging the parts 12 and 13 from the rim of the vessel.

The advantages of the device are manifest and manifold. The device is very simple and may be manufactured of ordinary wire and sold at a small cost. There is nothing to break or be readily lost about the device and if properly flexible wire is used the device will be applicable to almost any size of vessel used in the ordinary household. There are no crevices which cannot be easily cleaned so that the device may be readily washed or sterilized to keep the same in properly sanitary condition. The device is instantly adjustable to the vessel to which it is desired to attach it and also to the implements which it is desired to support, the adjustment being effected by a simple sliding of the hook 16.

Having thus described my invention, what I claim is:—

1. An attachment for cooking vessels comprising a member adapted to embrace the edge of the vessel and to be supported externally of the vessel by said embracing action, and a plurality of relatively movable hooks carried by said member and adapted to depend within a vessel.

2. An attachment for cooking vessels comprising an arcuate member hooked at its ends to embrace the edge of a vessel, and a utensil supporting hook slidably mounted on said member and adapted to depend within a vessel.

3. An attachment for cooking vessels comprising a flexible member hooked at its ends to embrace the edge of a vessel and to thereby support the member externally of such vessel, and a utensil supporting hook movably mounted on said member and adapted to depend within a vessel.

4. A utensil support for cooking vessels, comprising a pair of spaced inverted hooks adapted to embrace and hang upon the rim of a vessel, a member extending between said inverted hooks and an article supporting hook slidable on said member.

5. In combination with a device according to claim 4, normally disposed hooks forming integral continuations of the inverted hooks and adapted to support implements within a vessel.

6. A device according to claim 4, in which the utensil hook may be swung about the member carrying it to occupy positions inside and outside a vessel.

7. An attachment for cooking utensils comprising a supporting member having vessel engaging means and a normally depending hook having its shank slidably and pivotally connected to said supporting member.

In witness whereof, I have hereunto set my hand.

MINNIE A. OWEN.

Witnesses:
BEATRICE MACKINNON,
CARROLL LIVINGSTON.